United States Patent
Gao et al.

(10) Patent No.: US 8,218,642 B2
(45) Date of Patent: Jul. 10, 2012

(54) MACRO-BLOCK VIDEO STREAM ENCODING

(75) Inventors: Yi Zhi Gao, Shanghai (CN); Jia Jun Liu, Shanghai (CN); Xing Liu, Shanghai (CN); Bao Sheng Lu, Shanghai (CN); Jia Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 12/557,252

(22) Filed: Sep. 10, 2009

(65) Prior Publication Data

US 2010/0074337 A1    Mar. 25, 2010

(30) Foreign Application Priority Data

Sep. 24, 2008  (CN) .......................... 2008 1 0165686

(51) Int. Cl.
*H04N 7/12* (2006.01)
(52) U.S. Cl. ............................. 375/240.16; 375/240.26
(58) Field of Classification Search ...... 375/240–240.29
See application file for complete search history.

(56) References Cited

U.S. PATENT DOCUMENTS

| 6,785,330 | B1* | 8/2004 | Whealton et al. | 375/240.11 |
| 2004/0005002 | A1* | 1/2004 | Saw | 375/240.01 |
| 2004/0240548 | A1* | 12/2004 | Morad et al. | 375/240.12 |
| 2006/0165163 | A1* | 7/2006 | Burazerovic et al. | 375/240.03 |
| 2007/0286281 | A1* | 12/2007 | Tsuchiya et al. | 375/240.14 |
| 2009/0034615 | A1* | 2/2009 | Yano | 375/240.12 |
| 2010/0020877 | A1* | 1/2010 | Au et al. | 375/240.16 |

FOREIGN PATENT DOCUMENTS

CN          101150719 A        3/2008

* cited by examiner

*Primary Examiner* — Hong Cho
(74) *Attorney, Agent, or Firm* — Matthew C. Zehrer

(57) ABSTRACT

A video stream encoding apparatus and method therefore is herein described. The video stream encoding apparatus includes a divider for dividing a frame in a video stream into a plurality of processing units, each processing unit including a plurality of macro-blocks; and an encoder for encoding the plurality of macro-blocks in each processing unit in parallel. The same quantization parameters are used for respective macro-blocks in the same processing unit in the quantization of the encoder. By the apparatus and the method of the invention, dependencies between macro-blocks are broken, and the precision of high rate controlling is kept while encoding the respective macro-blocks in parallel.

8 Claims, 6 Drawing Sheets

MACRO-BLOCK VIDEO STREAM ENCODING

TECHNICAL FIELD

The invention generally relates to the video signal processing, and more particularly to a video stream encoding apparatus and a method therefor.

BACKGROUND ART

In recent years, in the video encoding applications, there has been increasing demand for the encoding speed. However, it is very difficult for the conventional encoding methods such as MPEG2 and H.263 to be parallelized in multi-processor systems.

The conventional encoding process divides the frames of an inputted video stream into macro-blocks (MBs), performs the motion estimation (ME) in the unit of macro-block, then carries out discrete cosine transformation (DCT), quantization (Q) process, de-quantization ($Q^{-1}$) and inverse discrete cosine transformation (IDCT), performs variable length coding (VLC) on the quantized data, and finally obtains the encoded data stream.

The encoding method is difficult to be parallelized due to dependencies between some procedures of the encoding process. This is most apparent in the rate-control process, because in order to control the rate, the quantization parameters for the quantization process on the current MB have to depend on the encoding results of previous MBs.

In order to solve the parallelization problem of the video encoding, a technology for parallelizing the off-line MPEG-2 encoding on Group of Picture (GOP) basis has been proposed in "*A Scalable off-line MPEG-2 video encoding scheme using a multiprocessor*", Ishfaq Ahmad, Shahriar M. Akramullah, Ming L. Liou, Muhanmmad Kafil, and "*A parallel MPEG-2 video encoder with look-ahead rate control*", Tiwari, P. Viscito, E., Thomas J. Watson. In addition, a method for parallelizing the motion estimation process for a single MB has been proposed in "*Architecture of a Fast Motion Estimator for MPLEG Video Coding*", Nam Ling, Rajesh Advani.

SUMMARY OF THE INVENTION

In various embodiments of the present invention an apparatus and a method for parallel and real-time encoding on the video stream is presented.

In an embodiment a video stream encoding apparatus includes a divider for dividing a frame in a video stream into a plurality of processing units, each processing unit including a plurality of macro-blocks, and an encoder for encoding the plurality of macro-blocks in each processing unit in parallel.

In another embodiment a video stream encoding method includes a dividing step of dividing a frame in a video stream into a plurality of processing units, each processing unit including a plurality of macro-blocks, and an encoding step of encoding the plurality of macro-blocks in each processing unit in parallel.

With the apparatus and the method according to embodiments of the invention, the dependencies between the macro-blocks are broken, and a universal solution which is platform-independent is provided.

In addition, the encoding processes on the macro-blocks in one processing unit are divided into two stages; i.e., a first stage including the motion estimation, discrete cosine transformation, quantization, de-quantization, and inverse discrete cosine transformation, and a second stage including the variable length coding, and the two stages are processed in pipeline, thereby the encoding speed is further improved. Accordingly, the limitation of the limited local memory of the memory non-sharing multi-core architecture can be solved and abated.

In addition, an application of the expanded double-buffering technology can ensure that the buffer capacity is enough for VLC operations, and output from the variable length coding to the buffer and output from the buffer to another memory can be performed simultaneously, thereby improving the encoding performance.

BRIEF DESCRIPTION OF DRAWINGS

The above and other aspects, features and advantages of the invention will be understood better by those skilled in the art from the detailed description for the respective embodiments of the invention in conjunction with the accompanying drawings, in which the same or alike reference numbers in all the drawings denote the same or alike parts.

DETAILED DESCRIPTION OF THE INVENTION

Embodiments of the invention will be described in detail herein below with reference to the drawings. If it is considered that the detailed description for some related art may confuse the invention, then its detailed description will be omitted.

Figure 1:
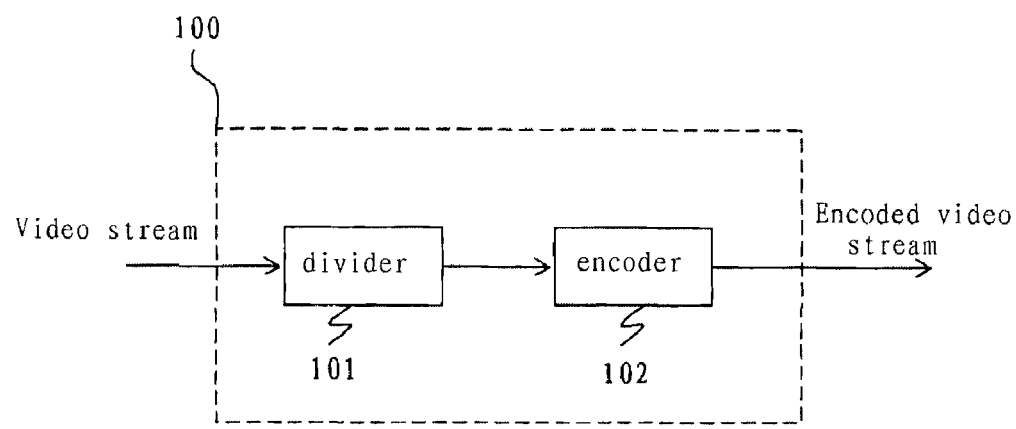
FIG. 1 is a block diagram showing a video stream encoding apparatus according to one embodiment of the invention.

FIG. 1 shows a block diagram of the configuration of a video stream encoding apparatus 100 according to one embodiment of the invention. As shown in FIG. 1, the video stream encoding apparatus 100 may include a divider 101 and an encoder 102. The divider 101 is used to divide a frame in a video stream into a plurality of processing units, wherein each processing unit may include a plurality of macro-blocks. The encoder 102 is used to encode the plurality of macro-blocks in each processing unit in parallel, and output the encoded code stream.

The above processing units will be described herein below with reference to FIG. 2.

Figure 2:
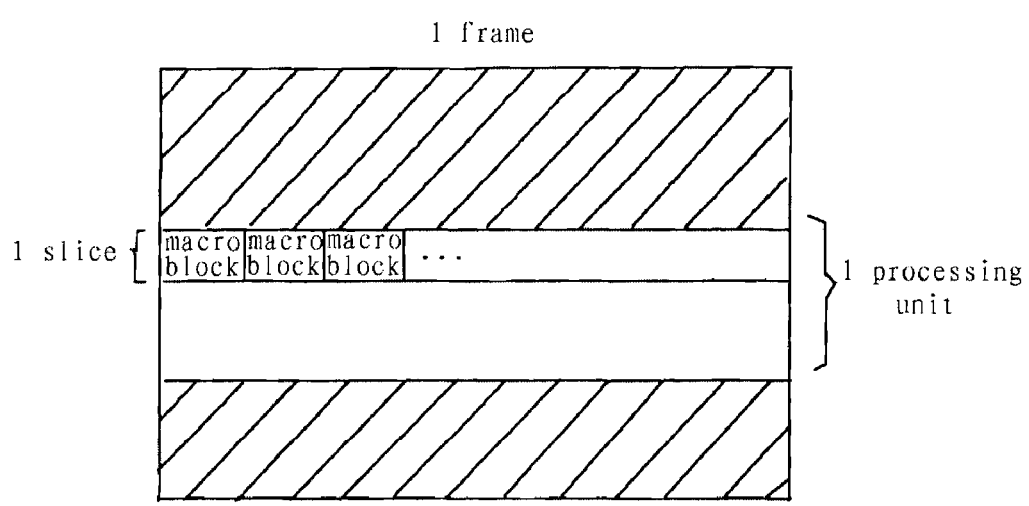
FIG. 2 is a schematic diagram showing a processing unit according to one embodiment of the invention.

FIG. 2 is a schematic diagram of configuration of a processing unit according to one embodiment of the invention. As shown in FIG. 2, a frame in a video stream may be divided into a plurality of processing units, and each processing unit may include a plurality of macro-blocks. In the embodiment of the invention, individual macro-blocks contained in one processing unit are encoded in parallel by the encoder 102, thereby obtaining respective encoded code streams. In the prior art, each frame in a video stream is encoded in the unit of macro-block in time sequence. According to one embodiment of the invention, all the macro-blocks arranged in time sequence in each frame of a video stream are divided into sections, of which each section constitutes one processing unit containing sequentially-arranged multiple macro-blocks. The previously-arranged processing unit is referred to as "the previous processing unit", and the subsequently-arranged processing unit is referred to as "the subsequent processing unit".

Figure 3:
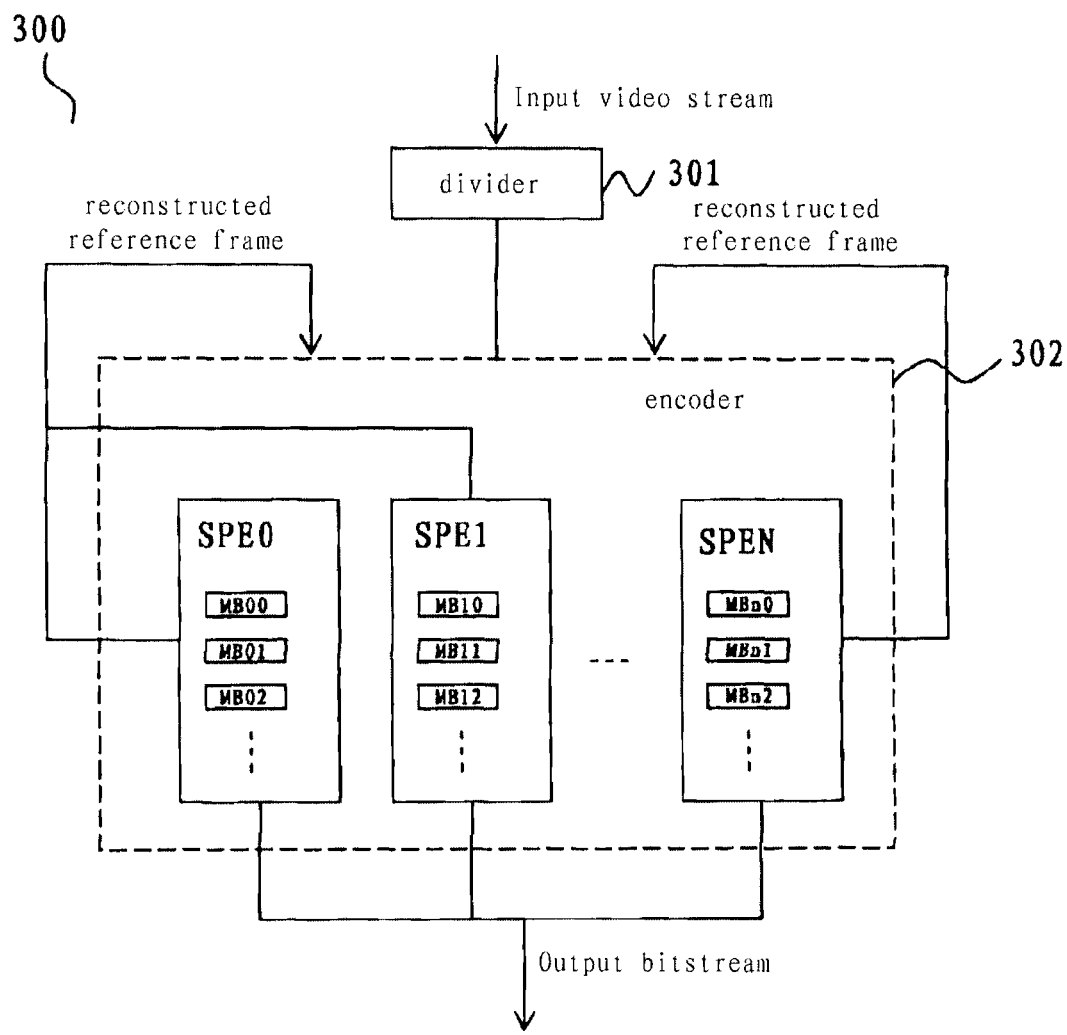
FIG. 3 is a block diagram showing a video stream encoding apparatus according to another embodiment of the invention.

The size of the processing unit according to the embodiment of the invention is not intended to limit the technical scope of the invention. Each processing unit may include one or more slices, in which each slice is composed of macro-blocks in a line. The amount of the slices included in each processing unit may be arbitrarily set according to the precision required for controlling the encoding speed. FIG. 3 shows a block diagram of a video stream encoding apparatus according to another embodiment of the invention.

As shown in FIG. 3, the video stream encoding apparatus 300 according to another embodiment of the invention includes a divider 301 and an encoder 302. The divider 301 divides each frame in the inputted video stream into a plurality of processing units, and sequentially inputs the divided respective processing units into the encoder 302, wherein each processing unit includes a plurality of macro-blocks. The encoder 102 encodes the plurality of macro-blocks in each processing unit in parallel, and outputs the encoded code stream.

Specifically, the encoder 302 may include a plurality of co-processors SPE 1~N, herein it is assumed that the number of the plurality of co-processors is N, and the MBs in the $M^{th}$ processing unit are being processed in parallel.

In one embodiment, the encoder 302 equally divides the plurality of macro-blocks in the $M^{th}$ processing unit into N groups, and assigns the divided groups to the respective co-processors SPE 1~N included in the encoder 302 respectively so that the plurality of co-processors SPE 1~N perform processes such as the motion estimation, discrete cosine transformation, quantization, de-quantization, inverse discrete cosine transformation, and variable length coding, etc., on the assigned macro-blocks in parallel.

For example, the $0^{th}$ group of macro-blocks is assigned to the co-processor (synergistic processing element) SPE0, and the co-processor SPE0 performs the motion estimation, discrete cosine transformation, quantization, de-quantization, inverse discrete cosine transformation, and variable length coding on the macro-blocks MB00, MB01, MB02 . . . in the $0^{th}$ group of macro-blocks. The $1^{st}$ group of macro-blocks is assigned to the co-processor SPE1, and the co-processor SPE1 performs processes such as the motion estimation, discrete cosine transformation, quantization, de-quantization, inverse discrete cosine transformation, and variable length coding, etc. on the macro-blocks MB10, MB11, MB12 . . . in the $1^{st}$ group of macro-blocks. Similarly, the $N^{th}$ group of macro-blocks is assigned to the co-processor SPE N, and the co-processor SPE N performs processes such as the motion estimation, discrete cosine transformation, quantization, de-quantization, inverse discrete cosine transformation, and variable length coding, etc., on the macro-blocks MBn0, MBn1, MBn2 . . . in the $N^{th}$ group of macro-blocks.

Those persons skilled in the art will know that the above embodiment is only one preferred embodiment, and it is also possible to use the co-processors SPE1-SPEN to only perform one or more of the following processes: the motion estimation, discrete cosine transformation, quantization, de-quantization, inverse discrete cosine transformation, and variable length coding, with the remaining processes are performed by a main processing part or other parts, and in such a way, the object of processing in parallel can also be realized.

It is even possible that the partial of the above processes are performed by partial co-processors, while the other processes in the above processes are performed by other co-processors. All the related modifications can realize the technical solution for processing in parallel, and fall into the protection scope of the invention.

In addition, the encoder 302 divides the plurality of macro-blocks in the $M^{th}$ processing unit into N groups, in which the amount of the macro-blocks in each group may be not equal, and the processing on macro-blocks in parallel can also be realized.

When the respective co-processors SPE 1~N perform encoding process on the respective macro-blocks in the $M^{th}$ processing unit, a buffer (not shown in FIG. 3, will be described in detail with reference to FIG. 6 below) stores the outputs of the variable length coding on each macro-block, and the quantization parameters of the $M^{th}$ processing unit are obtained so that the encoder 302 perform encoding processes on the respective macro-blocks in the subsequent processing unit, such as the next processing unit M+1.

When performing encoding processes on the plurality of macro-blocks in the $M^{th}$ processing unit, the same quantization parameters are used for all macro-blocks in the respective co-processors SPE 1~N. That is, the encoder 302 uses the same quantization parameters for the respective macro-blocks in the same processing unit to perform the quantization process. The quantization parameters are calculated with reference to the encoding results of the previous processing units. For example, one method is that the encoder 302, after performing the variable length coding on the respective macro-blocks in the (M−1)th processing unit, calculates the full level of the virtual buffer according to actual bits and target bits, by using the rate-control algorithm in Test Model 5 of MPEG-2, and then selects the quantization parameters for the $M^{th}$ processing unit; i.e., the same quantization parameters used for all the macro-blocks in the $M^{th}$ processing unit, according to the full level of the virtual buffer.

Since all the macro-blocks in one processing unit share the same quantization parameters, the respective co-processors SPE 0, SPE 1, . . . , SPE N perform encoding processes on the assigned macro-blocks in parallel. The video streams encoded by the respective co-processors SPE 0, SPE 1, . . . , SPE N are emerged to be output as the encoded stream, and the outputs after the variable length coding are fed backed to the encoder 302 as a reconstructed reference frame to be used as a reference when processing the subsequent processing elements.

For example, the quantization parameters of the current processing unit M is calculated out with reference to the encoding result of the previous processing unit which preferably is the processing unit M−1 according to one embodiment of the invention. However, the invention is not limited to this, and according to other embodiments of the invention, the previous processing unit also can be the processing unit M−2, processing unit M−3 and so on. In addition, it needs to be noted that the amount of the macro-blocks contained in each group of macro-blocks has no special limitation, and may be one or any number.

In addition, according to another embodiment of the invention, the divider 301 and the encoder 302 can further include related memories or buffers (not shown), to perform buffering operations on the data transmitted between the respective elements in the divider 301 and encoder 302.

Figure 4:
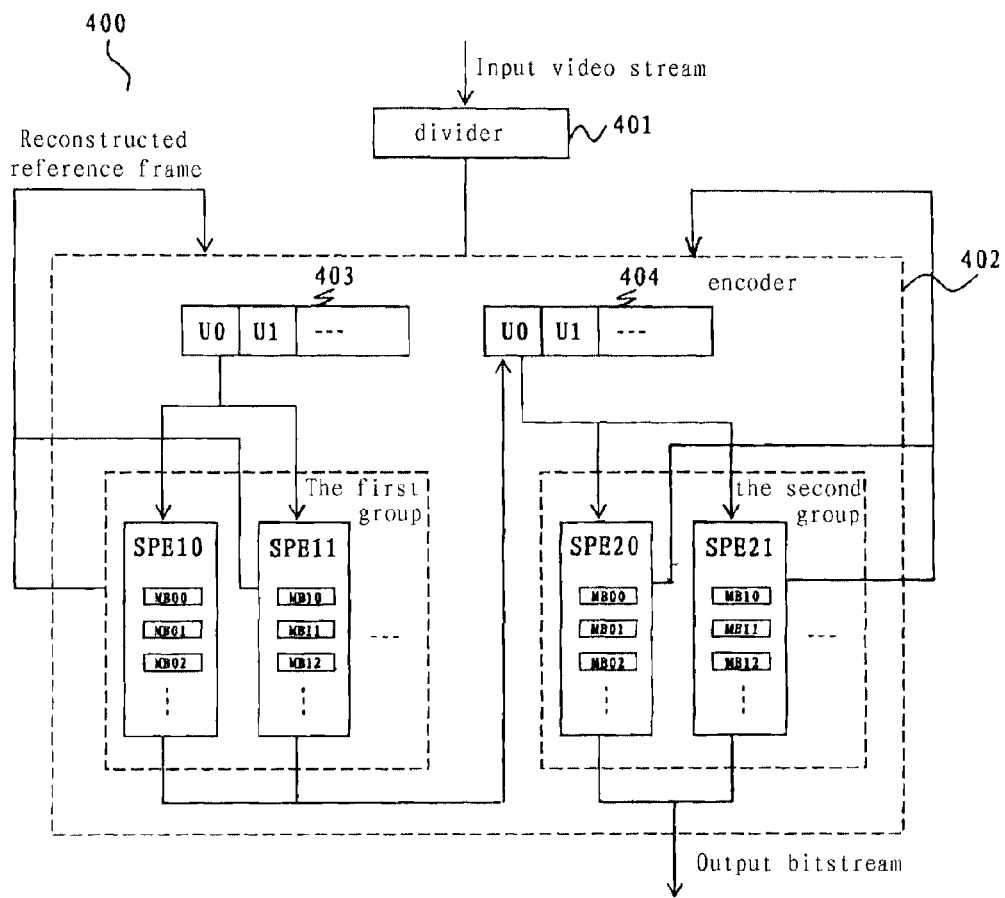
FIG. 4 is a block diagram showing a video stream encoding apparatus according to a further embodiment of the invention.

FIG. 4 shows a block diagram of a video stream encoding apparatus according to a further embodiment of the invention.

As shown in FIG. 4, the video stream encoding apparatus 400 according to the further embodiment of the invention includes a divider 401, an encoder 402, a video buffer 403 and an inter-group buffer 404 and so on. The divider 401 divides each frame in the inputted video stream into a plurality of processing units U0, U1, U2, . . . , and sequentially stores the divided respective processing units U0, U1, U2, . . . in the video buffer 403, with each processing unit including a plurality of macro-blocks. The encoder 402 sequentially extracts the stored respective processing units U0, U1, U2, . . . from the video buffer 403, encodes the plurality of macro-blocks in each processing unit in parallel, and outputs the encoded stream.

The difference between the present embodiment and the embodiment shown in FIG. 3 lies in that in the present embodiment, the plurality of co-processors SPEs are grouped into two groups; i.e., the first group and the second group. The first group includes the co-processors SPE10, SPE11, . . . , while the second group includes the co-processors SPE20, SPE21, . . . , and so on. According to the present embodiment, the amount of the first group of the co-processors SPE10, SPE11, . . . is the same with the amount of the second group of the co-processors SPE20, SPE21, . . . . The persons skilled in the art will know that the co-processors can be arbitrarily grouped as necessary for practicing the invention.

It is assumed here that the amount of co-processors in the first group and the amount of co-processors in the second group are both N, and the respective macro-blocks in the processing unit U0 are being processed in parallel. The encoder 402 divides all the macro-blocks in the processing unit U0 equally into N groups, and assigns the respective groups to the co-processors SPE10, SPE11, . . . in the first group included in the encoder 402, to perform parallel processes on the respective macro-blocks therein. The co-processors SPE10, SPE11, . . . in the first group perform at least one of the processes such as the motion estimation, discrete cosine transformation, quantization, de-quantization, and inverse discrete cosine transformation on the respective macro-blocks in the processing unit U0. After the co-processors SPE10, SPE11, . . . in the first group perform the above processes on the respective macro-blocks in the processing unit U0, the processed respective macro-blocks are stored into the inter-group buffer 404.

The co-processors SPE20, SPE21, . . . in the second group read the processing unit U0 processed by the first group of co-processors from the inter-group buffer 404, and perform the variable length coding on the respective macro-blocks therein. That is, the whole encoding operations on each processing unit are accomplished by collaboration of the first group and the second group of co-processors; i.e., firstly the motion estimation, the discrete cosine transformation, the quantization, the de-quantization, and the inverse discrete cosine transformation and so on are performed by the first group of co-processors SPE10, SPE11, . . . , and then the variable length coding on the macro-blocks processed by the first group of co-processors is performed by the second group of co-processors SPE20, SPE21, . . . . For example, as shown in FIG. 4, the respective macro-blocks in the processing unit U0 are firstly dispatched to the first group of the respective co-processors SPE10, SPE11, . . . , subjected to the processing of the motion estimation, the discrete cosine transformation, the quantization, the de-quantization, the inverse discrete cosine transformation and so on in parallel in the respective co-processors SPE10, SPE11, . . . , and then the processing result of the processing unit U0 is passed to the second group of co-processors SPE20, SPE21, . . . . In the second group, the respective macro-blocks in the processing unit U0 are also dispatched to the respective co-processors SPE20, SPE21, . . . and subjected to the variable length coding process in parallel in the respective co-processors SPE20, SPE21, . . . .

When the second group of respective co-processors performs the variable length coding process on the respective macro-blocks in the processing unit U0, a buffer (not shown in FIG. 4, will be described in detail below with reference to FIG. 6) stores the output from the variable length coding on each macro-block, and the quantization parameters of the processing unit U0 are obtained so that the encoder 402 performs the encoding processes on the respective macro-blocks in the next processing unit U1. Meanwhile, the video stream after the variable length coding is output as the output steam.

While the second group of respective co-processors is performing the variable length coding process on the respective macro-blocks in the processing unit U0, the respective co-processors in the first group are reading respective macro-blocks in the processing unit U1 from the video buffer 403, and performing the corresponding processes on the read macro-blocks in parallel.

When the first group of co-processors SPE10, SPE11, . . . performs encoding on the plurality of macro-blocks in the processing unit U0, the same quantization parameters are used for all the macro-blocks in the processing unit U0, the quantization parameters being derived from the output of the variable length coding on the respective macro-blocks in the processing unit prior to the processing unit U0 by the encoder 402. Specifically, the encoder 402 uses the same quantization parameters to perform the quantization process on the respective macro-blocks in the same processing unit, and, for example, the quantization parameters used for the processing unit Un are derived from the output of the variable length coding on the respective macro-blocks in the previous processing unit Un-2 (will be described in detail below with reference to FIG. 5).

According to another embodiment of the invention, the video buffer 403 and the inter-group buffer 404 may be omitted, and the various processing data is directly transferred between the divider 401 and the respective groups of co-processors of the encoder 402.

From the above description, the encoder 402 according to one embodiment of the invention includes two groups of co-processors, in which the first group of co-processors performs at least one of the motion estimation, the discrete cosine transformation, the quantization, the de-quantization, the inverse discrete cosine transformation, etc., on the respective macro-blocks in each processing unit in parallel, and the second group of co-processors performs the variable length coding processes on the respective macro-blocks processed by the first group of co-processors in parallel.

Figure 5:
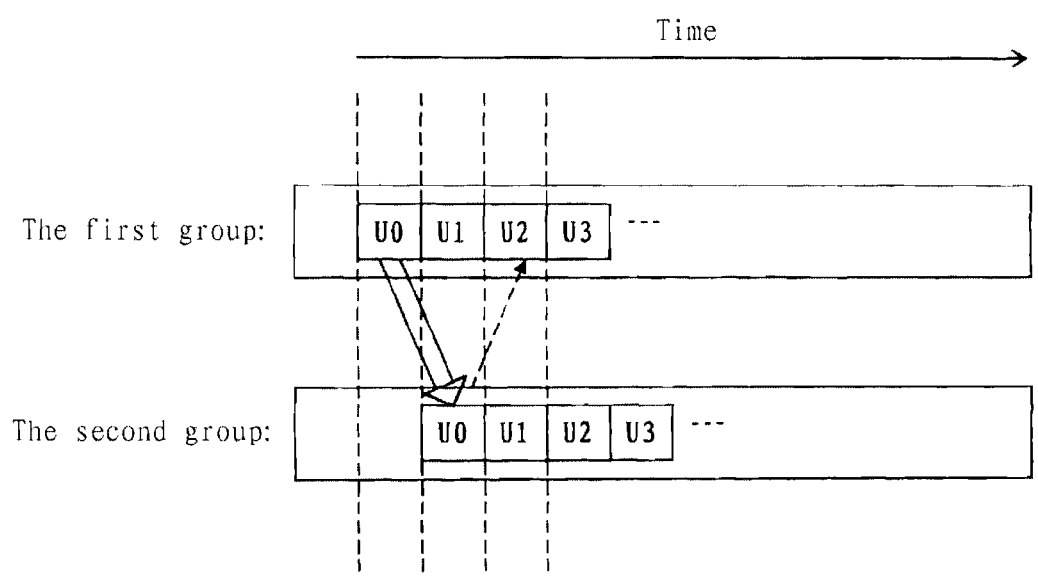
FIG. 5 is a diagram showing the relationship between processing operations of two groups of co-processors according to one embodiment of the invention.

FIG. 5 is a view showing the relationship between the processing operations of the two groups of co-processors according to one embodiment of the invention.

As shown in FIG. 5, after the first group of co-processors performs processes (the motion estimation, the discrete cosine transformation, the quantization, the de-quantization and the inverse discrete cosine transformation) on the plurality of macro-blocks in the processing unit U0, the second group of co-processors performs variable length coding processes on the respective macro-blocks in the processing unit U0, and meanwhile, the first group of co-processors performs parallel processes; i.e., the motion estimation, the discrete cosine transformation, the quantization, the de-quantization and the inverse discrete cosine transformation, on respective macro-blocks in the subsequent processing unit U1, and so on.

According to one embodiment of the invention, when the first group of co-processors is processing respective macro-blocks in the $n^{th}$ processing unit, the second group of co-processors is processing respective macro-blocks in the n-$1^{st}$ processing unit, wherein, the quantization parameters used in processing the respective macro-blocks in the $n^{th}$ processing unit by the first group of co-processors are based on the output of the variable length coding on respective macro-blocks in the n-$2^{nd}$ processing unit by the second group of co-processors.

Specifically, for example, as shown in FIG. 5, when the first group of co-processors processes respective macro-blocks in the $2^{nd}$ processing unit U2, the second group of co-processors processes respective macro-blocks in the $1^{st}$ processing unit U1, and the quantization parameters used in processing the respective macro-blocks in the $2^{nd}$ processing unit U2 by the first group of co-processors are derived from the output of the variable length coding on the respective macro-blocks in the $0^{th}$ processing unit U0 by the second group of co-processors.

Certainly, the invention is not limited to this, the quantization parameters used in processing the respective macro-blocks in the $n^{th}$ processing unit by the first group of co-processors can also be based on the output of the variable length coding on, for example, the n-$3^{rd}$ or the n-$4^{th}$ processing unit by the second group of co-processors performs.

In the embodiment, the encoding speed is further improved by separating the overall processes for encoding the respective macro-blocks in one processing unit into two stages; i.e., a first stage including the motion estimation, the discrete cosine transformation, the quantization, the de-quantization, the inverse discrete cosine transformation processes, and a second stage including the variable length coding, and performing processes on the two stages in a pipeline fashion. And, the embodiment is especially advantage for the memory non-shared multi-core architecture. The respective co-processors in the memory non-shared multi-core architecture have their respective local memories for storing the code and the data. However, since the capacity of the local memories of the co-processors SPEs is limited, one executable file could be even larger than the capacity of its local memory. In this case, the conventional encoding method can not be effectively run in this memory non-shared multi-core architecture. By partitioning the whole encoding process of one macro-block to be performed by different co-processors, the present embodiment of the invention can overcome the issue that the encoding methods such as MPEG2 can not be run in parallel due to the limited local memory.

In some cases, it is necessary to firstly buffer the variable length output of the variable length coding, and then output it to, for example, a certain memory. According to one embodiment of the invention, the encoder of the invention further includes expanded double-buffer 600.

Figure 6:
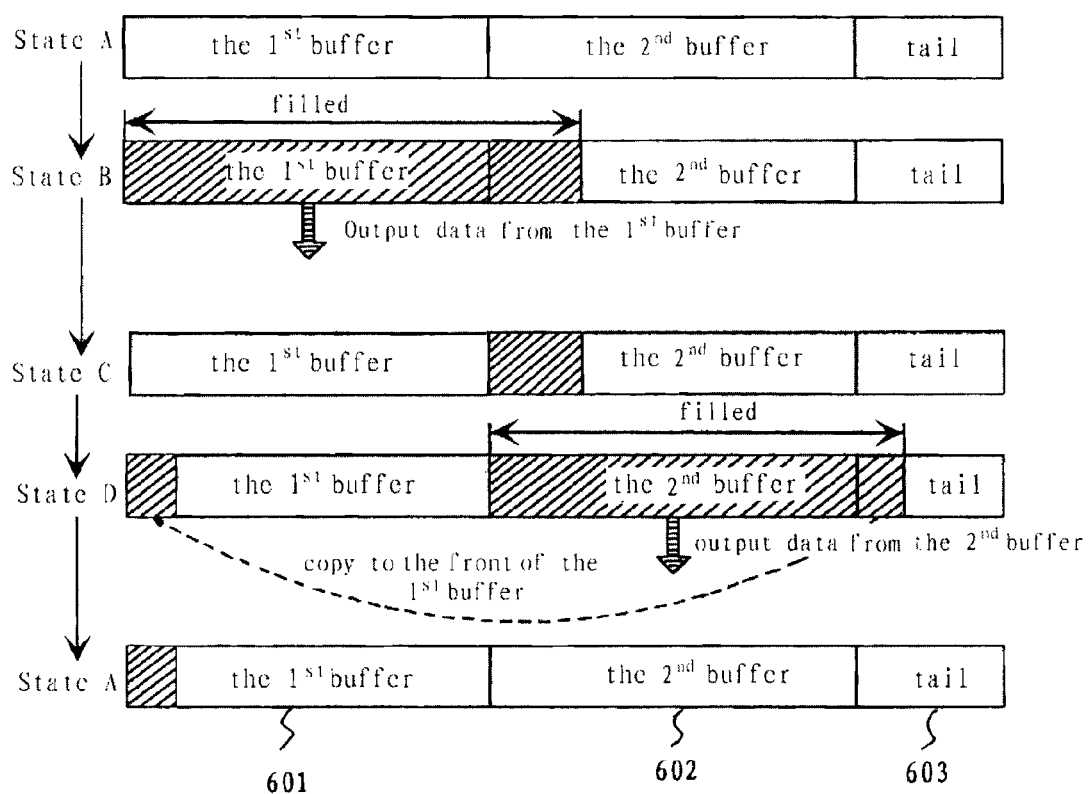
FIG. 6 is a diagram showing working states of the expanded double buffers according to one embodiment of the invention.

FIG. 6 shows a diagram of the working states of the expanded double-buffer according to one embodiment of the invention.

As shown in FIG. 6, the expanded double-buffer 600 includes a first buffer 601, a second buffer 602 and a tail buffer 603. Since the length of VLC output for respective macro-blocks is variable, the expanded double-buffer can ensure that the buffer capacity is enough for VLC operations. The expanded double-buffer 600 runs in the following way: each time the VLC operation for a macro-block is done, the output of the VLC for the macro-block is sequentially stored into the double-buffer 600, and the accumulated output length is calculated. When the accumulated output length exceeds a predetermined threshold, for example, exceeds the length of the first buffer 601 or the second buffer 602, the data stored in the fulfilled buffer is output, while the exceeded data is kept unchanged, or is copied to an appropriate location. Thereby, the first buffer 601 and the second buffer 602 are used alternately, whereby efficiency is improved compared with the case that only one buffer is used and hence more waiting time is needed.

Specifically, the expanded double-buffer 600 in FIG. 6 works as follows. State A represents an initial state of the double-buffer 600. Next, in state B, when the VLC output length accumulated in the double-buffer 600 exceeds, for example, the storage capacity of the first buffer 601, the exceeded part is stored in the second buffer 602, and the data in the first buffer 601 is output to other devices, for example, output to a main memory (not shown) of the encoder according to the embodiment of the invention. At the same time, the second buffer 602 continuously receives and stores the VLC output for the respective macro-blocks, and the received VLC output is sequentially stored at the position after the exceeded part in the second buffer 602, as shown in state C. Next, as shown in state D, when the data sequentially stored in the second buffer 602 exceeds the storage capacity of the second buffer 602, the exceeded data part is stored in the tail buffer 603, and at the same time, the data stored in the second buffer 602 is output to other devices, for example, output to the main memory (not shown) of the encoder according to the embodiment of the invention, and the data stored in the tail buffer 603 is copied to the beginning portion of the first buffer 601, thus the subsequent received VLC encoding output can be sequentially stored at the position after the exceeded part stored in the first buffer 601, so that the double-buffer 600 returns to the state A, and a next round of cyclic buffer begins.

The above expanded double-buffer technology proposed in the embodiment can solve the restriction of the addressing and data size of the buffer, and can also simultaneously perform the output from the variable length coding to the buffer and the output from the buffer to another memory, thereby improve the performance. The expanded double-buffer technology can apply to any case where it is necessary to buffer the data transmitted between the different devices.

Figure 7:
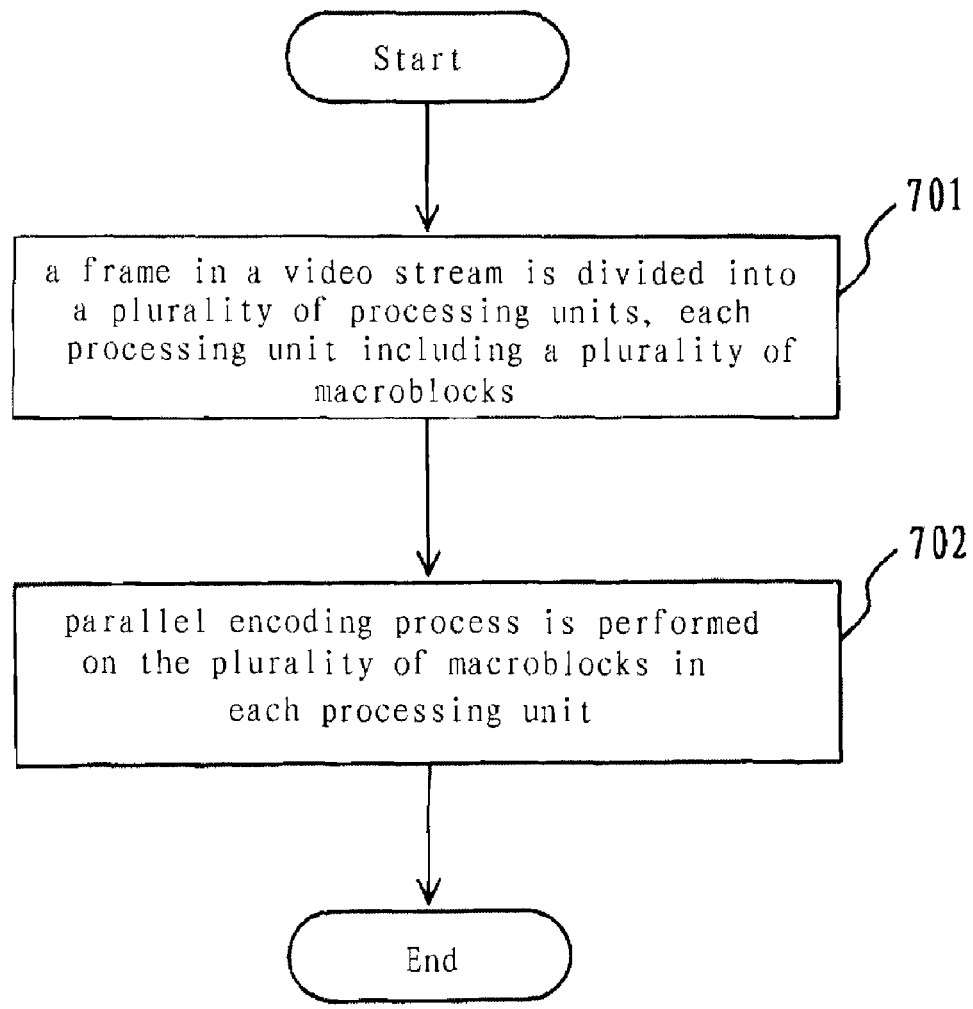
FIG. 7 is a flowchart showing the video stream encoding method according to one embodiment of the invention.

FIG. 7 shows a flowchart of the video steam encoding method according to one embodiment of the invention.

As shown in FIG. 7, the video stream encoding method according to the one embodiment of the invention includes: a dividing step 701 of performing dividing process to divide a frame in a video stream into a plurality of processing units, wherein each processing unit includes a plurality of macro-blocks, an encoding step 702 of performing encoding process to encode the plurality of macro-blocks in each processing unit in parallel.

According to another embodiment of the invention, the encoding step 702 includes a step of performing the quantization process, wherein the same quantization parameters are used for respective macro-blocks in the same processing unit. The same quantization parameters used for the processing unit are derived from the output of the variable length coding on the respective macro-blocks in the previous processing unit.

According to another embodiment of the invention, the encoding step 702 includes a step of assigning the plurality of macro-blocks in one processing unit to each of the plurality of co-processors in the encoder to perform one or more of the following processes on the assigned macro-blocks: the motion estimation, the discrete cosine transformation, the quantization, the de-quantization, the inverse discrete cosine transformation, and the variable length coding.

According to another embodiment of the invention, the encoding step 702 includes a step of partitioning the plurality of co-processors in the encoder into two groups, using the first group of co-processors to perform at least one process of the motion estimation, the discrete cosine transformation, the quantization, the de-quantization and the inverse discrete cosine transformation on the respective macro-blocks in a processing unit, and using the second group of co-processors to perform the variable length coding on the respective macro-blocks processed by the first group of co-processors in parallel.

According to another embodiment of the invention, the encoding step 702 further includes a step of when the plurality of co-processors in the first group process respective macro-blocks in the $n^{th}$ processing unit, using the plurality of the co-processors in the second group to process respective macro-blocks in the $n-1^{st}$ processing unit, wherein the quantization parameters used when the plurality of co-processors in the first group process the respective macro-blocks in the $n^{th}$ processing unit are derived from the output of the variable length coding on the respective macro-blocks in the $n-2^{nd}$ processing unit by the plurality of co-processors in the second group.

According to another embodiment of the invention, the encoding step 702 further includes a step of using the expanded double-buffer to sequentially store the output of variable length coding on each macro-block, wherein the expanded double-buffer includes a first buffer, a second buffer and a tail buffer, and when the length of the stored data exceeds the memory capacity of the first buffer, the exceeded part is stored in the second buffer, and the data stored in the first buffer is output; when the continuously stored data exceeds the storage capacity of the second buffer, the exceeded part is stored in the tail buffer, and the data stored in the second buffer is output, and the data stored in the tail buffer is transmitted to the first buffer, thereby alternatively using the first buffer and the second buffer.

In the apparatus and the method according to the embodiment of the invention, the same quantization parameters are used when quantizing respective macro-blocks in the same processing unit, and the quantization parameters are calculated by means of the encoding result of the macro-blocks in the previous processing unit. Since the respective macro-blocks in the same processing unit use the same quantization parameters, the dependencies between the respective macro-blocks in a processing unit are broken so that parallel processing can be realized among respective macro-blocks in one processing unit. Compared with the solutions based on fame or based on GOP in the related art, the method of the present invention based on a processing unit which is smaller than a frame can control the bit rate with higher precision.

In addition, it needs to be noted that the embodiment of the invention can be implemented by hardware, software, firmware or their combination, and the implementation modes should not be construed as a limitation to the technical scope of the invention.

The connection relationship between the respective elements (units) in the present invention is not to limit the technical scope of the invention, wherein one or more elements can include or be connected with any other elements.

Although some embodiments of the invention have been shown or described with reference to the drawings, the person skilled in the art should understand that these embodiments can be changed or modified without departing from the principle and the spirit of the invention, as long as they still fall into the scope of the claims of the invention and their equivalences.

What is claimed is:

1. A video stream encoding apparatus, including:
a divider for dividing a frame in a video stream into a plurality of processing units, each processing unit including a plurality of macro-blocks; and
an encoder for in parallel encoding the plurality of macro-blocks in each processing unit,
wherein said encoder includes two groups of co-processors, the first group of co-processors performing at least one process of motion estimation, discrete cosine transformation, quantization, de-quantization and inverse discrete cosine transformation on respective macro-blocks in said processing unit in parallel, the second group of co-processors performing variable length coding on the respective macro-blocks processed in said first group of co-processors in parallel,
wherein when the first group of co-processors processes respective macro-blocks in an $n^{th}$ processing unit, the second group of co-processors processes respective macro-blocks in an $n-1^{st}$ processing unit, and quantization parameters used when the first group processes the respective macro-blocks in the $n^{th}$ processing unit are derived from an output of the variable length coding on the respective macro-blocks in an $n-2^{nd}$ processing unit by the second group.

2. The video stream encoding apparatus recited in claim 1, wherein said first group of co-processors performs quantization process, and uses the same quantization parameters for respective macro-blocks in the same processing unit, said quantization parameters being calculated with reference to the encoding result of a previous processing unit.

3. The video stream encoding apparatus recited in claim 1, wherein said encoder includes a plurality of co-processors, and the plurality of macro-blocks in each processing unit are respectively assigned to said plurality of co-processors, said plurality of co-processors performing at least one of the following processes on the assigned macro-blocks in parallel:
motion estimation, discrete cosine transformation, quantization, de-quantization, inverse discrete cosine transformation, and variable length coding.

4. The video stream encoding apparatus recited in claim 1, further including an expanded double-buffer for sequentially storing the output of the variable length coding on each macro-block, the expanded double-buffer including a first buffer, a second buffer and a tail buffer, wherein when the length of the stored data exceeds the storage capacity of the first buffer, the exceeded part is stored in the second buffer, and the data stored in the first buffer is output, whereas when the sequentially stored data exceeds the storage capacity of the second buffer, the exceeded part is stored in the tail buffer, the data stored in the second buffer is output, and the data stored in the tail buffer is transferred into the first buffer, thereby alternatively using the first buffer and the second buffer.

5. A video stream encoding method comprising:
dividing a frame in a video stream into a plurality of processing units, each processing unit including a plurality of macro-blocks; and
encoding the plurality of macro-blocks in each processing unit, wherein in said encoding step, a plurality of co-processors are partitioned into two groups, the first group of co-processors performing at least one process of motion estimation, discrete cosine transformation, quantization, de-quantization and inverse discrete cosine transformation on respective macro-blocks in said each processing unit in parallel, and the second group of co-processors performing variable length coding on the respective macro-blocks processed by said first group of co-processors in parallel, wherein when the first group of co-processors processes respective macro-blocks in an $n^{th}$ processing unit, the second group of co-processors processes respective macro-blocks in an $n-1^{st}$ processing unit, and quantization parameters used when the first group processes the respective macro-blocks in the $n^{th}$ processing unit are derived from an output of the variable length coding on the respective macro-blocks in an $n-2^{nd}$ processing unit by the second group.

6. The video stream encoding method recited in claim 5, wherein said encoding step, the quantization process is performed, and the same quantization parameters are used for respective macro-blocks in the same processing unit, said quantization parameters being calculated with reference to the encoding result of a previous processing unit.

7. The video stream encoding method recited in claim 6, wherein in said encoding step, the plurality of macro-blocks in said each processing unit are assigned to said plurality of co-processors respectively, and at least one of the following processes are performed on the assigned macro-blocks in parallel: the motion estimation, discrete cosine transformation, quantization, de-quantization, inverse discrete cosine transformation, and variable length coding.

8. The video stream encoding method recited in claim 5, further including the step of using an expanded double-buffer to sequentially store the output of the variable length coding on each macro-block, wherein when the length of the stored data exceeds the storage capacity of a first buffer, the exceeded part is stored in a second buffer, and the data stored in the first buffer is output, whereas when the sequentially stored data exceeds the storage capacity of the second buffer, the exceeded part is stored in a tail buffer, the data stored in the second buffer is output, and the data stored in the tail buffer is transferred into the first buffer, thereby alternatively using the first buffer and the second buffer.

* * * * *